United States Patent [19]

Schwenninger

[11] 3,994,710
[45] Nov. 30, 1976

[54] MIXER FOR USE IN GLASS MELTING FURNACE

[75] Inventor: Ronald L. Schwenninger, Wichita Falls, Tex.

[73] Assignee: PPG Industries, Inc., Pittsburgh, Pa.

[22] Filed: Oct. 30, 1975

[21] Appl. No.: 627,397

[52] U.S. Cl. .................................. 65/135; 65/136; 65/335
[51] Int. Cl.² ........................................... C03B 5/16
[58] Field of Search .............. 65/134, 135, 136, 335

[56] References Cited
UNITED STATES PATENTS 2,533,826  12/1950  Lyle ..................................... 65/136

*Primary Examiner*—Arthur D. Kellogg
*Attorney, Agent, or Firm*—E. Kears Pollock

[57] ABSTRACT

Unmelted glass materials floating along the surface of a pool of molten glass in a glass melting furnace are broken up from a continuous batch blanket or floating logs of batch into smaller logs and are forced downwardly into the molten glass and mixed with the molten glass in order to enhance the rate at which the unmelted glass batch materials are melted and reacted to form additional molten glass.

22 Claims, 5 Drawing Figures

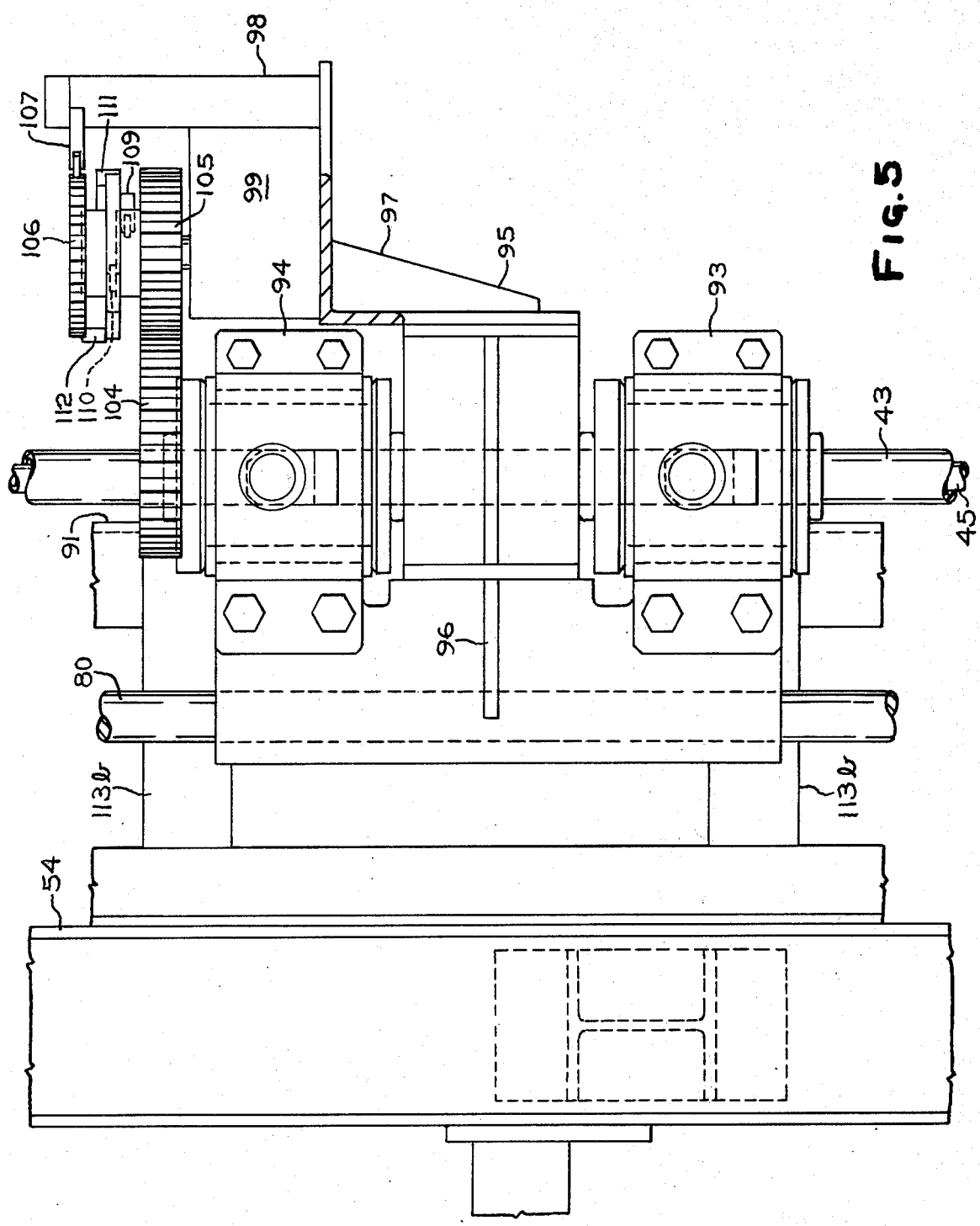

MIXER FOR USE IN GLASS MELTING FURNACE

BACKGROUND OF THE INVENTION

1. Field of the Invention

This invention relates broadly to the art of glassmaking. More particularly, it is concerned with a method and apparatus for mixing unmelted batch materials with molten glass in a glass melting tank or furnace in order to improve the melting efficiency of the furnace.

2. Description of the Prior Art

In the manufacture of glass, raw materials are first melted and reacted to form molten glass. This molten glass is then conditioned and formed into useful articles. Raw batch materials for manufacturing glass comprise scrap glass or cullet, sand, limestone, soda ash, salt cake, rouge and the like. Raw batch materials are charged to a glass melting furnace in the continuous manufacture of glass. Heat is supplied within the glass melting furnace to melt the raw batch materials and permit the necessary reaction to occur so that molten glass is formed from batch materials.

Conventionally known glass melting furnaces are generally either recuperative furnaces or regenerative furnaces. These furnaces are provided with means for supplying heat to batch materials and molten glass contained in the furnace by the combustion of fuels using preheated air. Heat is generally supplied to the molten glass and the glass batch materials by burning a fossil fuel such as oil, gas or powdered coal in a space above the molten glass and glass batch materials so that flames pass over them causing a transfer of heat to them. Additional heat may be supplied to the molten glass in such furnaces by using submerged heaters, typically electric heaters. Also furnaces using electric heaters alone have been known.

In typical conventional furnaces, a chamber for containing the molten glass is provided. The chamber for containing glass comprises the bottom of the furnace, side walls which are generally parallel to the general movement of glass through the furnace, a back wall in the vicinity of which raw batch materials are fed or charged into the furnace and a front wall at the opposite end of the furnace from the back wall in the vicinity of which conditioned molten glass is removed from the furnace for forming. Extending over the chamber of the furnace is a roof which provides a headspace above the molten glass. The heating flames are directed into this headspace above the molten glass, generally from firing ports located along the opposing side walls of the furnace.

Raw glass batch materials are charged to the furnace generally through an opening in its back wall. Most conventional furnaces are provided with a "fill doghouse" extending outwardly a short distance from the back wall. Raw glass batch materials are charged into the furnace through such a fill doghouse. They may be charged continuously using a blanket feeder or the type described in the following U.S. Pats. Nos. 1,623,057 and 2,624,475 which show devices for feeding a single layer of batch; U.S. Pat. Nos. 2,114,545 and 2,711,837 which show continuous belt devices for feeding two layers — one of cullet and one of batch over the cullet; U.S. Pat. No. 2,829,784 which shows a rotating paddle device for feeding two layers — one of cullet and one of batch; and U.S. Pat. No. 2,773,611 which shows a device for feeding three layers of batch and cullet.

Alternatively, glass batch materials may be charged using intermittent push feeders such as described in the following U.S. Pats. Nos. 1,483,278, 1,913,665, 1,916,262, 1,917,247, 1,953,221, 2,281,050, 2,284,398, 2,284,420, 2,471,336, 2,556,467, 2,815,135 and 3,193,119 which show devices for feeding continuous transverse logs of batch; U.S. Pat. No. 2,831,567 which shows side wall pushers; U.S. Pat. No. 2,934,221 which shows a device for feeding divided logs and U.S. Pat. No. 509,930, U.S. Pat. Nos. 1,928,016 and 1,941,897 which show devices for feeding two or more streams of batch intermittently to a furnace.

However, the glass batch materials enter the furnace; following charging, they float along the surface of molten glass contained within the bottom portion of the furnace as a blanket-like layer. The blanket-like layer of raw batch material advances along the surface of molten glass in the glass melting furnace in a downstream direction away from the fill doghouse and toward the front wall of the furnace. As the blanket-like layer of glass batch materials float downstream through the glass melting furnace, it receives heat both from the heating flames extending over it and from the molten glass beneath it. This causes the batch materials to melt and react forming more molten glass. Usually, but not always, a blanket-like layer of raw batch materials in the vicinity of the fill doghouse is substantially continuous and extends nearly from one side wall to the opposite side wall of the furnace. As the batch materials move through the glass melting furnace, melting occurs and the blanket of batch material gradually breaks up into individual floating islands or logs of batch material. In a conventional, regenerative furnace having six or seven firing ports on each side and producing glass at a rate of 400 to 500 tons per day, the floating glass batch is found to melt out by about the third to fourth firing port downstream from the fill doghouse. Downstream of the location where the floating batch material is melted out, there extends for a short distance a surface foam on the surface of the molten glass as volatile products of reaction are refined from the molten glass.

The blanket-like layer of unmelted glass batch materials, which floats along the surface of the pool of molten glass, acts as a thermal insulator so that glass batch materials inside the blanket do not readily recieve sufficient heat for rapid melting and reaction either from the molten glass beneath the blanket of batch or from the flames above the blanket of batch. Workers in the art of glassmaking have developed a variety of techniques for enhancing the melting of glass batch materials. For example, U.S. Pat. No. 2,533,826 to Lyle describes a batch-enfolding device for use in a fill doghouse. A rabble is provided which is moved in an orbital motion so that molten glass is brought up from beneath the floating blanket of glass batch material and folded over portions of batch materials in successive folds. This has the effect of providing better heat transfer between molten glass and the unmelted batch materials but also has the effect of isolating unmelted batch material somewhat from the heating flames above them. If molten glass enfolding is substantially complete, the molten glass over a pocket of unmelted batch serves as a reflector to reflect heat from the flames away from the molten glass and may actually reduce the rate in which the unmelted batch inside the layer of batch reacts and melts.

While the melting enhancement techniques of the past have been primarily directed to acting upon glass batch material in or near the fill doghouse of a glass melting furnace, the unmelted batch advancing downstream through the furnace between the firing port has been largely ignored and permitted to melt at its natural rate in such furnace surroundings. The present invention contemplates a technique for enhancing the melting of glass batch materials in the space of a glass melting furnace where heat is applied to the glass by improving the transfer of heat directly to the advancing glass batch.

SUMMARY OF THE INVENTION

At a location generally along the center portion of a glass melting furnace and within its melting zone downstream from its inlet end (fill doghouse) a floating blanket of glass batch material is intermittently broken up along grooves both transverse to the downstream direction of batch advance and along various oblique angles with respect to its path of advance.

The blanket of batch materials is broken up by periodically forcing a bar or member downwardly through the batch materials into the molten glass and then withdrawing the bar upwardly rotating it slightly and repeating the cylce of forcing it downwardly through the floating batch materials at a different angle with respect to the advance of the floating batch materials and withdrawing it again. This is repeated again and again to break up the floating blanket of batch into relatively small floating islands or logs of batch and to repeatedly expose additional unmelted ingredients to the molten glass and to the flames extending over the glass in a fuel-fired furnace. In a furnace that is not fired, e.g., an electric furnace, the batch when broken up is repeatedly exposed to more molten glass thereby enhancing melting. Even though the mixing bar employed to break up the floating blanket of glass batch materials is cooled to maintain its structural integrity, the effect of breaking up the batch blanket is such that glass batch may be melted at an increased rate when using the same amount of fuel or other source of heat for melting the batch. Alternatively, the amount of glass batch material fed to a furnace and melted in it may be held constant while the fuel or power supplied to the furnace for melting the glass batch materials is decreased. This second procedure is found to be particularly desirable in that while production rates are maintained, the temperatures of the crown refractories of the furnace can be substantially reduced. This has the beneficial consequence of reducing the rate of crown refractory deterioration and reducing the possiblity for stone defects in the glass produced due to runnage or drippage from the crown refractories.

In a particularly preferred embodiment of this invention, the mixing bar is in the form of a "T" bar connected to a vertical reciprocation and horizontal rotation mechanism located outside and above the crown of a glass melting furnace in order to periodically lift the bar and then work it downwardly into batch materials and to rotate the bar slightly during that portion of each cycle when it is lifted out of the batch materials. Such a device which is characterized as a T bar mixer comprises a T bar having a vertical leg and a horizontal bar at its lower extreme. The horizontal bar is the bar for engaging and breaking through floating glass batch materials. The vertical leg of the T bar extends through an opening in the crown of a glassmaking furnace and is connected to means for reciprocating it upwardly and downwardly and for rotating it about its vertical axis as defined by it vertical leg. The vertical leg and horizontal bar are preferably made of tubular elements so that a coolant fluid may be directed through them and maintain their temperatures sufficiently low so that a thermal failure is not experienced. With such a T bar mixer, couplings are provided at the upper, exposed end of the vertical leg of the mixer and flexible conduits are connected to said couplings in order to provide for feeding a coolant fluid to the mixture and carrying hotter coolant away from it.

At its upper end the vertical leg is mounted in rotatable bearing members and in translatable bearing members. The vertical leg is connected to controllable motor devices, preferably pneumatic or electric, which are employed to periodically lift the mixer and then force it downwardly into the batch materials and to incrementally rotate the mixer during the time when it is lifted out of the glass batch material. Incremental rotation of from 5° to 45° per cycle is generally provided while rotation of from 10° to 20° per cycle is preferred. This invention may be further appreciated, particularly in its apparatus aspects, from a study of the drawings accompanying this application along with a description of those drawings.

BRIEF DESCRIPTION OF THE DRAWINGS

FIG. 5 is a detailed elevation view of the mechanism for rotating the T bar mixer.

DETAILED DESCRIPTION OF THE INVENTION

Figure 1:
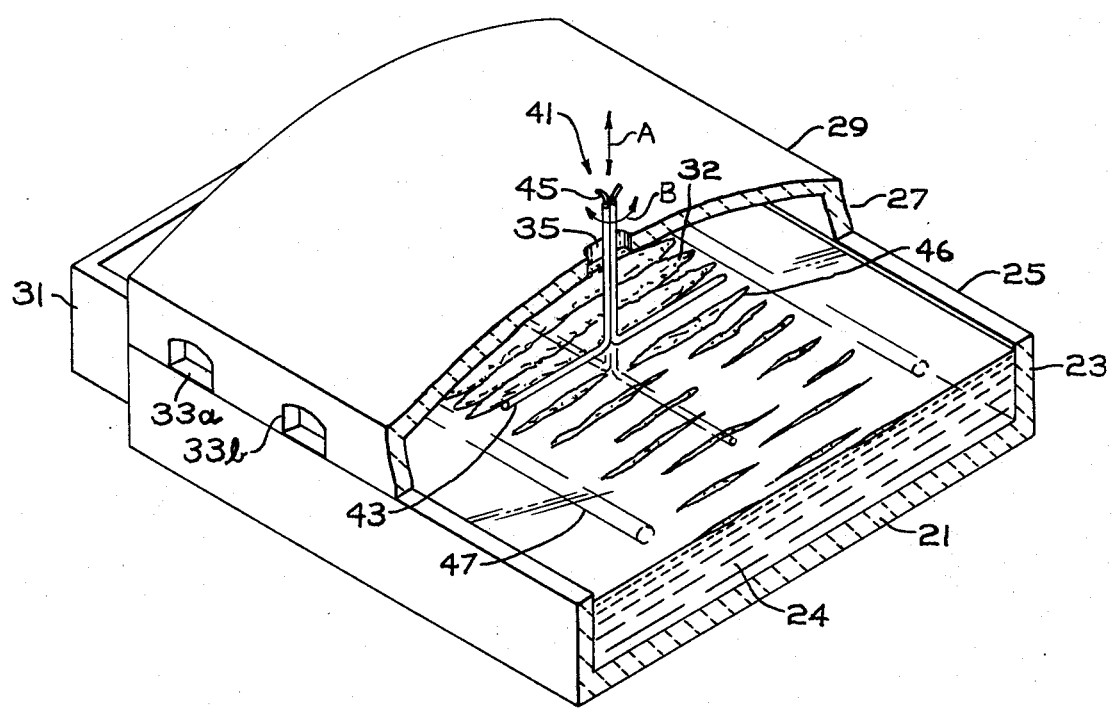
FIG. 1 is a partially cut-away isometric view of the melting portion of a regenerative glassmaking furnace showing the T bar mixer according to this invention and a raised position (solid lines) and in a lowered positon (phantom lines)

Referring to FIG. 1, a glass melting furnace comprises a bottom 21 and side walls or basin walls 23. Along with the ends of the furnace the bottom 21 and basin walls 23 contain a pool of molten glass 24 having an upper surface just below the top ledges 25 of the basin walls. Extending upwardly from the basin walls 25 are breast walls 27. Joining the breast walls 27 and extending over the furnace is a roof or crown 29. Extending in an upstream direction from the upstream end of the furnace is a fill doghouse 31 into which glass batch materials are either periodically or continuously fed to the furnace. Glass batch materials advance as a blanket-like layer of batch 32 along the surface of the pool of molten glass 24 in a generally downstream direction from the fill doghouse 31 through the melting section of the furnace until the batch is broken up and melted into the molten glass. Firing ports 33 are provided along the breast wall portion of the side walls above the molten glass. These firing ports are connected to the regenerators or recuperators in a conventional manner and burners (not shown) extend into them so that flames may be directed over the glass batch materials in the furnace.

An opening or slot 35 is provided in the crown 29, generally in the central portion of the crown and preferably between the second and third firing ports, as counted from the upstream end of the furnace. Extending into the furnace through the slot is a batch mixer, preferably a T bar mixer 41. The preferred batch mixer includes an outer pipe 43 and an inner pipe 45 so that a cooling fluid may be directed through the inner pipe and the annular space between the outer pipe to cool them and maintain their structural integrity in the hot, hostile environment of the glassmaking furnace. With such a design Schedule 80 stainless steel pipes, 1 inch and 2 inch O.D., may be used. As seen in FIG. 1, the pipes are bent to provide both a vertical leg and a horizontal bar portion to the mixer. In a preferred embodiment of this invention, the glass melting furnace is also provided with submerged guide bars 47 as described by W. M. Welton in U.S. patent application Ser. No. 528,374 filed Nov. 29, 1974.

During operation the T bar mixer is rciprocated upwardly and downwardly as shown by double headed arrow "A" and is periodically rotated as shown by double headed arrow "B" as it is lifted up from contact with floating batch materials. On each cycle of reciprocation, as the horizontal bar of the mixer is forced downwardly into the floating batch material, it breaks the blanket or logs of batch material into smaller segments 46 and exposes new unmelted batch materials to the flames and to the molten glass. This enhances the rate at which the unmelted glass batch materials react and are melted to form additional glass. As shown in FIG. 1, the mixer is shown by solid lines in its raised position with the horizontal bar extending transversely across the furnace and across the path of advance of unmelted batch material through the furnace. It is shown in phantom lines rotated 90° with respect to the transverse position and parallel to the path of advance of unmelted batch material through the furnace and to the length of the furnace itself. It is thought convenient to raise and lower such a mixer at a frequency of from about 5 cycles per minute to about 25 cycles per minute and to rotate the mixer from about 20° to about 30° per cycle. Rotation is conveniently limited through a 90° arc. Since the preferred mixer extends outwardly in both directions from its axis of rotation, this limited rotation and reversal effectively constitutes a 180° arc through while the mixing is effectuated in successive increments of rotation. It is believed that the reciprocation frequency may be adjusted over a wide range while achieving the benefits of this invention.

Figure 2:
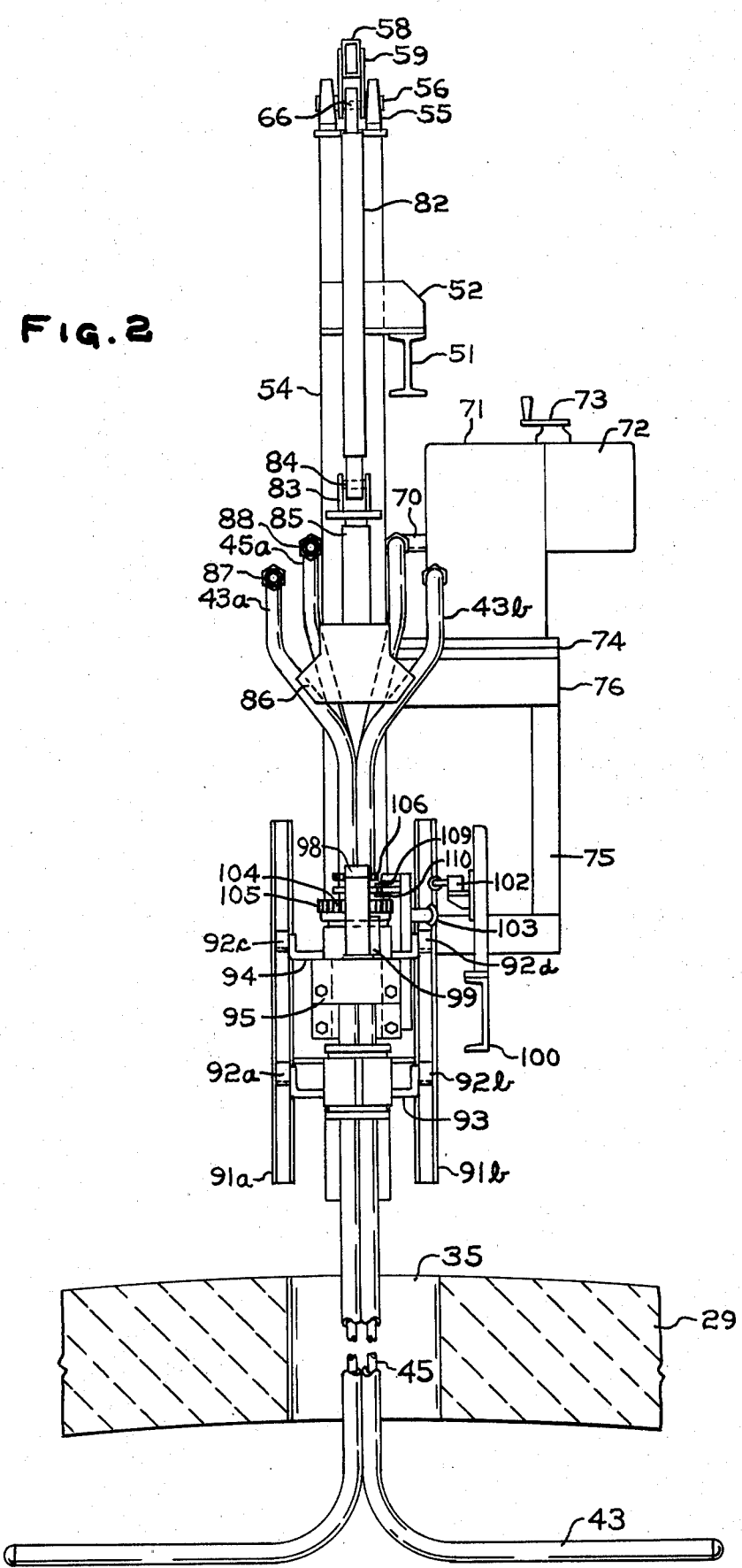
FIG. 2 is an elevation view of the T bar mixer according to this invention seen transverse to the length of the furnace and to the path of advance of unmelted batch materials through the furnace.
Figure 3:
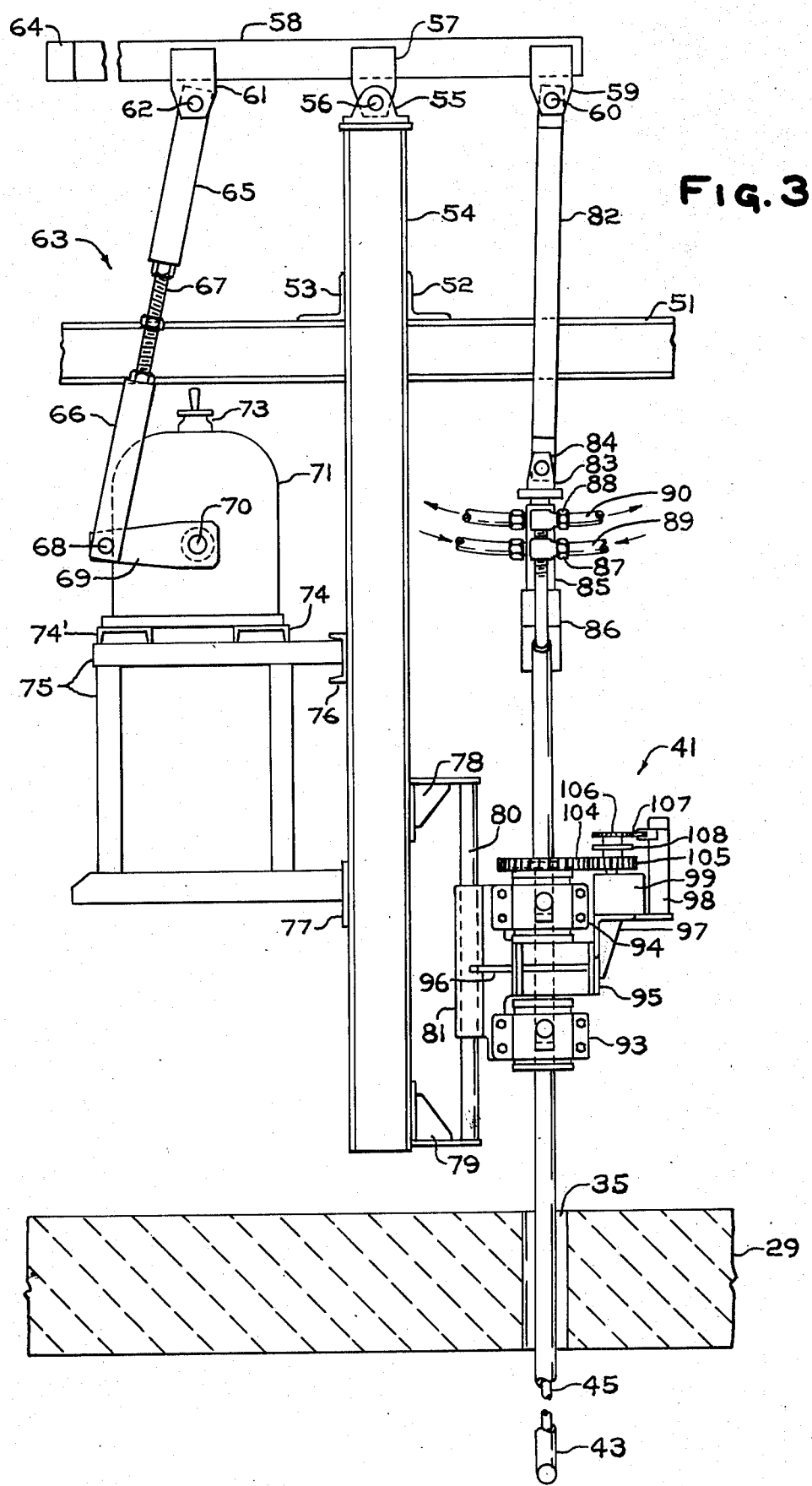
FIG. 3 is an elevation view of the T bar mixing apparatus and its associated mechanism for reciprocating and rotating the mixer viewed in a plan parallel to the length of the furnace and to the path of advance of unmelted glass batch materials.

Referring now to FIGS. 2 and 3, the details of the apparatus for reciprocating the mixer may be more fully appreciated. The entire apparatus is mounted onto a structural support 51 which may be an I-beam as shown. The support 51 may conveniently be a structural member such as a roof chord serving as an external structure for the furnace itself. Mounted on the structural support member 51 by means of brackets 52 and 53 is a vertical channel beam 54. A pillow block or pivot bearing 55 is mounted on the upper end of the vertical beam 54. This pillow block 55 includes an axle bearing 56 and a pivot mount 57 to which there is connected a rocker arm 58. The rocker arm 58 has mounted on it at one end a pivot mount 59 for the mixer assembly itself, which pivot mount 59 includes an axle bearing 60. Mounted on the rocker arm 58 toward the end opposite from the pivot mount 59 for the mixer assembly is a second pivot mount 61 including an axle bearing for connection to a reciprocal drive assembly 63. Also mounted on the end of the rocker arm 58 opposite from the end to which the mixer is connected is a counterweight 64 to balance the mixer assembly and thereby reduce and equalize the work done by the reciprocal drive assembly 63 in reciprocating the device.

The reciprocal drive assembly 63 includes an upper shaft 65 and a lower shaft 66 connected by a turnbuckle 67 or other convenient means for adjusting the length of the shaft. The shaft is connected at its upper end to the axle bearing 62 of the reciprocal drive assembly pivot mount 61. At its opposite end the shaft is connected by a pin 68 to a rotating arm 69 mounted on a drive axle 70 to which is connected a variable drive motor 71. The drive 71 perferably has connected to it a speed controller 72 having a speed control handle 73 for adjusting speed of rotation of the variable drive motor and thereby adjusting the frequency of reciprocation of the assembly. The variable drive motor 71 is mounted on a support platform 74 which is connected to a support frame 75 mounted by means of a frame mounting channel 76 and frame mounting plates 77 to the vertical channel beam 54.

Also connected to the vertical channel beam 54 by upper and lower brackets, 78 and 79, is a vertical reciprocation shaft 80 for receiving a sleeve 81 to which the mixer assembly 41 is connected. The sleeve 81 is translatably mounted about the vertical reciprocation shaft 80 so that as the assembly is reciprocated upwardly and downwardly, the sleeve is caused to slide upwardly and downwardly on the shaft 80. This maintains the alignment of the mixer. The mixer assembly 41 is connected to the rocker arm 58 through the pivot mount 59 by a lift arm 82 connected to the axle bearing 60 of the mount. Connected to the opposite end of the lift arm 82 is a pivotable joint 83 having a pin or axle bearing 84 connecting to the lift arm 82. Mounted on the joint 83 is a collar 85 and connected to it is a yoke 86.

Outer conduit connectors 87 and inner conduit connectors 88 are mounted on the yoke 86. Connected to the outer conduit connectors 87 are flexible hoses and connected to the inner conduit connectors 88 other flexible hoses. These are provided for supplying a coolant to the assembly and carrying coolant from the assembly. The outer conduits 43 comprising the mixer are connected to the conduit connectors 87 and secured to the yoke 86.

Mounted on the outer conduits 43 and also connected to the sleeve 81 is a mixer rotation assembly. A pair of tracks 91 are connected to the lower potion of the vertical channel beam 54 by brackets 113 (seen in FIG. 4 but removed from FIG. 3 for clarity). Wheels 92 connected respectively to a lower carriage mount 93 and an upper carriage mount 94 engage the tracks 91. The upper and lower carriage mounts, 93 and 94, are mounted about the vertical leg portions of the outer conduits 43 so that the conduits are free to rotate within the mounts 93 and 94. A main carriage mount 95 is connected to the sleeve 81 through a sleeve plate 96. The main carriage 95 surrounds the vertical leg portions of the outer conduits 43 so that they are free to rotate within the carriage 95. While the conduits 48 are free to rotate inside the carriage, the carriage 93, 94 and 95) is connected to and mounted on the conduits 43 by bearing means 114 so that translation movement between the conduits 43 and the carriage (93, 94, 95) is precluded. Thus, as the assembly is raised and lowered by lift arm 82, the carriages (93, 94, 95) move in convert with the conduits 43. The rotation assembly is mounted on and forms a part of the carriage. The carrigae is connected to the sleeve 81 which engages the shaft 80 and is also connected to the wheels 92 which engage the vertical tracks 91.

The carriage includes a rotation mount bracket 97 and a rotation stop limit switch post 98. A rotation motor 99 is mounted on the bracket 97 which is connected, in turn, through the main bracket 95 and the sleeve plate 96 to the slidably mounted sleeve 81. Mounted at a fixed elevation and separate from the assembly is a structural member or channel 100 and mounted on it is a start rotation limit switch 102. An engagement plate 103 for engaging the starter rotation switch is mounted on the upper bracket 94 of the rotation assembly carriage. During operation, as the entire assembly is raised upwardly, the engagement plate 103 engages the start rotation limit switch 102 causing the rotation motor 99 to start. Alternatively, the motor could operate continuously and a clutch could be engaged. by the action of the start limit swtich 102. So long as the assembly is in its raised position, rotation may continue but as it is lowered rotation is stopped in order to avoid unnecessary strain on the vertical leg, the mixing bar or other jointure due to resistance against rotation by the batch materials. To insure fail-safe cessation of rotation, the engagement plate 103 may be sufficiently long to keep switch 102 depressed as the assembly moves fully upwardly and then downwardly until almost engaging notch with the mixing bar, or the switch 102 may be used in combination with a suitable relay (not shown) to start rotation by closing the relay on a first pulse and stop rotation by opening the relay on a next or second pulse in which instance a short engagement plate 103 may be used.

Figure 4:
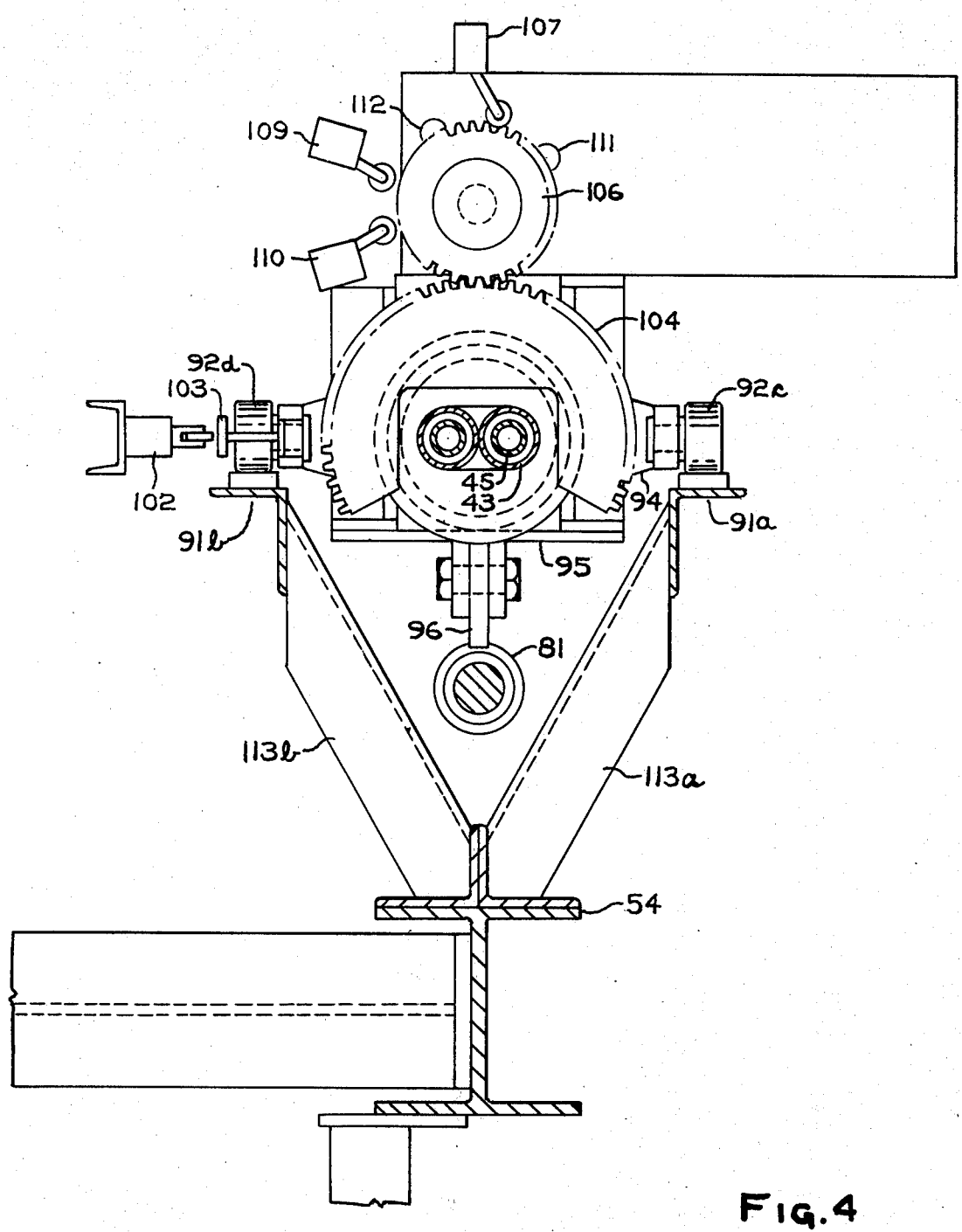
FIG. 4 is a sectional plan view of the mechanism for rotating the T bar mixer.

Referring now to particularly FIGS. 4 and 5, in addition to FIGS. 3 and 4, the rotation assembly is provided with a main rotation gear 104 which is secured to the vertical legs of the mixer by a plate 44 fixed about the outer conduits 45. The main rotation gear 104 is engaged by a rotation drive gear 105 connected by a drive shaft to the rotation motor 99. Also connected to the shaft of the rotation motor 99 is a rotation control gear 106. A rotation stop limit switch 107 is mounted on post 98 and is positioned for engagement by the rotation control gear 106. The rotation stop switch 107 and the start switch 102 are preferably connected to the rotation motor 99 so that either can stop rotation — switch 102 by disengagement or switch 107 by engagement. Sleeves 108 on the drive shaft of the rotation motor 99 separate the rotation drive gear 105 and the rotation control gear 106. Mounted adjacent the sleeve 108 are a pair of limit switches for reversing the direction of the rotation drive motor 99. Reverse limit switch 109 is connected to the drive motor 99 in a manner to provide for it rotating in a counter-clockwise direction as shown in FIG. 4 and reverse limit switch 110 is connected to the drive motor 99 in a manner to cause it to rotate in a clockwise direction as shown in FIG. 4. Connected to the sleeve 108 at different elevations corresponding to different elevations at which limit switch 109 and 110 are mounted are limit switch engagement pins 111 and 112 for respectively engaging limit switches 109 and 110. Also as seen in FIG. 4 there are provided brackets 113 for mounting the tracks 91 on either side of the assembly.

The procedure for rotating the mixer assembly may be appreciated by considering FIGS. 2 and 4 in particular. As the assembly is lifted upwardly, engagement plate 103 engages limit switch 102 causing the rotation motor 109 to operate in whatever direction of rotation it is then set to operate. The rotation occurs until a fixed member of counts occur on stop limit switch 107 as it is engaged by successive teeth of the rotation control gear 103. Rotation is then stopped as the signal from switch 107 stops the operation of the rotation drive motor 109. If rotation has not been stopped by switch 107 by the time the assembly is lowered to disengage switch 103, it stops rotation. The assembly then is forced downwardly into the glass batch materials of the furnace in the position into which it has been rotated. On the next cycle the rotation is again initiated in the same manner, and, assuming that the rotation ocurs until one of its limits is encountered, the rotation will be reversed on the next cycle. For example, the engagement pin 111 engages switch 109 which signals the rotation drive motor to drive in its opposite direction on the next cycle. The assembly is again forced downwardly into the batch and when it is again raised and rotation is again started closure of switch 102 by engagement plate 103, the direction which the motor 99 drives will be opposite to that of the previous cycle. This continues until engagement pin 112 engages limit switch 110 and rotation is again reversed and the cycles continue in a similar manner.

A typical operation may be described in reference to a glass melting furnace producing a soda-lime-silica glass at a rate at about 430 tons per day. A mixing device such as described is positioned on the center line of the furnace through the crown at a location midway between the second and third ports of the six-port regenerative furnace. The furnace is fired with natural gas at a rate of about 160,000 standard cu.ft./hour as glass is produced at a tonnage of about 400 tons per day before mixing is commenced. The molten glass, after conditioning, is delivered to a float bath and formed into a continuous sheet of flat glass. The mixer is operated at a reciprocation frequency of about 12 cycles per minute and is lifted clear of the unmelted batch on each cycle. On each cycle the mixer is rotated approximately 20° to 30° with its rotational travel limited to about 60° deflection in either direction from an original position transverse to the length of the furnace and to the advance of batch through the furnace. While holding the tonnage approximately constant, the natural gas feed rate to the furnace is reduced from approximately 160,000 standard cu.ft./hour to approximately 130,000 standard cu.ft./hour while the location at which the glass materials are observed to be fully melted out, actually move slightly upstream from near the downstream edge of the third port of the furnace to near the upstream edge of the third port of the furnace. This indicates that while the throughput of the furnace is left unchanged and the melting efficiency appears to be improved slightly, the fuel consumption has been reduced substantially (on the order of an 18% reduction in fuel).

Although this invention has been described with respect to particularly preferred embodiments thereof, those experienced in the art of glassmaking will recognize that variations may be made in the specific design of the invention without departing from its spirit or its scope as defined by the appended claims. For example, a plurality of mixers may be used in a single furnace, or the location of a mixer within a furnace may be varied. Also, the described mixer may be used with regenerative or recuperative furnaces whether end-fired or side-fired or may be used with an electrically heated furnace.

I claim:

1. In an apparatus for the manufacture of glass comprising a glass melting furnace having a bottom, side walls, a front wall, a back wall and a roof; further having, in the vicinity of said back wall, means for charging glass batch materials into said furnace, further having, in the vicinity of said front wall, means for discharging molten glass from said furnace; and further having means for supplying heat to at least a portion of said furnace for melting glass batch materials forming molten glass therefrom; wherein a portion of said furnace is for moving glass batch materials floating on molten glass in a general direction away from said back wall and toward said front wall while melting said floating glass batch materials; the improvement comprising
   a. an elongated, substantially horizontal mixing bar for engaging floating glass batch materials;
   b. means, connected to said mixing bar, for reciprocating it upwardly and downwardly through a stroke sufficient to force it downwardly substantially through the floating batch materials and upwardly sufficiently to clear the floating batch materials; and
   c. means, connected to said mixing bar, for rotating it about a substantially vertical axis to provide for its being forced downwardly through floating batch materials at a plurality of locations across the width of the furnace between its side walls.

2. The apparatus according to claim 1 wherein said mixing bar comprises a plurality of pipe sections adapted for receiving a coolant fluid for maintaining the bar below a desired temperature.

3. The apparatus according to claim 1 wherein said mixing bar is connected to said reciprocating means and said rotating means through a common vertical leg and said mixing bar extends outwardly from said leg in two directions.

4. The apparatus according to claim 3 wherein said mixing bar and said vertical leg comprise at least two conduits, each having a vertical leg extending through the roof of the furnace and a substantially horizontal extension, joined together along their vertical legs such that the horizontal extensions together comprise said mixing bar and said vertical conduit legs together comprise said vertical leg for the combination.

5. The apparatus according to claim 4 wherein each of said conduits is an outer conduit and mounted within it is an inner conduit and wherein said inner conduits are provided with conduit connectors and annular spaces between inner conduits and their respective outer conduits are provided with conduit connectors, said conduit connectors being located at the upper ends of said conduits outside the furnace and adapted for connection to a coolant supply.

6. The apparatus according to claim 4 wherein said vertical leg is connected near its upper end outside the furnace to said reciprocating means and has mounted on it near its upper end said rotating means.

7. The apparatus according to claim 6 wherein said reciprocating means comprises a rocker arm pivotably connected to said vertical leg pivotably mounted on a structural support and further connected to a drive means for rocking said rocker arm.

8. The apparatus according to claim 7 wherein said reciprocating means further includes means for stabilizing the position of said vertical leg during its reciprocation.

9. The apparatus according to claim 8 wherein said stablizing means comprises a fixedly mounted, vertically disposed shaft and a sleeve slidably engaged about said shaft and connected to a carriage member engaging said vertical leg such that said leg is rotatable with respect to said carriage member.

10. The apparatus according to claim 9 wherein said rotating means is connected to said carriage member and provided with means for engaging a rotatable member fixed to said vertical leg.

11. The apparatus according to claim 10 wherein said rotating means comprises a rotation drive motor and a rotation drive gear connected thereto and said rotatable member is a rotation gear engaged by said rotation drive gear.

12. The apparatus according to claim 11 wherein said rotating means is provided with means for starting rotation as said mixing bar and vertical leg combination is reciprocated upwardly to a raised position and means for stopping rotation while said combination is in a raised position.

13. The apparatus according to claim 12 wherein said means for starting rotation comprises a switch responsive to the vertical position of said vertical leg operatively connected to said drive motor.

14. The apparatus according to claim 12 wherein said means for stopping rotation comprises a switch responsive to the angular position of said mixing bar operatively connected to said drive motor.

15. The apparatus according to claim 12 wherein said rotating means further includes means for reversing the direction of rotation of said vertical leg and mixing bar.

16. The apparatus according to claim 15 wherein said reversing means comprises a pair of switches responsive to the angular position of said mixing bar, each operatively connected to said drive motor and each opposed to the other.

17. The apparatus according to claim 1 wherein said melting furnace is a multiport regenerative furnace having at least five firing ports on each side and wherein said mixing bar is mounted in the melting furnace between second and third ports of the furnace, counting from the back wall.

18. In the making of glass wherein glass batch materials are charged to a glass melting furnace having a bottom, side walls, a front wall, a back wall and a roof and wherein said charged glass batch materials are caused to move away from said back wall toward said front wall between said side walls as a floating layer of batch on the molten glass and wherein heat is supplied to said glass batch materials to melt them, forming molten glass, and wherein molten glass is discharged from said furnace in the vicinity of said front wall and formed into useful articles; the improvement comprising
   a. intermittently breaking through the moving floating layer of batch materials along an extended line by reciprocating a mixing bar upwardly and downwardly through the batch materials; and
   b. periodically varying the orientation of the line along which the floating layer of batch materials is intermittently broken by rotating the mixing bar between its upward and downward reciprocation a sufficient rotation about a vertical axis to cause a succeeding line along which the layer of batch materials is broken to intersect a prior line along which the layer of batch materials is broken, which intersection is within a portion of the furnace containing floating batch materials.

19. The method according to claim 18 wherein the glass melting furnace is a regenerative furnace having at least five firing ports and wherein the floating layer of batch is broken at least at a location between the second and third firing ports counted from the back wall of the furnace.

20. The method according to claim 19 wherein the floating layer of batch materials is broken along a line by reciprocating the mixing bar by lifting it upwardly and forcing it downwardly through the batch materials at a rate of from 5 to 25 cycles per minute.

21. The method according to claim 20 wherein said periodic varying of orientation is performed by rotating the mixing bar about a vertical axis at a rate of from about 20° to about 30° per cycle of reciprocating the mixing bar.

22. The method according to claim 21 wherein said mixing bar is reciprocated at a rate of about 12 cycles per minute.

* * * * *